Sept. 30, 1952  R. E. PARKS  2,612,357
REFRIGERATION AND CARBONATION UNIT
Filed Nov. 10, 1947  2 SHEETS—SHEET 2

INVENTOR.
Regis E. Parks
BY
Morgan, Finnegan & Durham
ATTORNEYS.

Patented Sept. 30, 1952

2,612,357

UNITED STATES PATENT OFFICE 2,612,357

REFRIGERATION AND CARBONATION UNIT

Regis E. Parks, Brooklyn, N. Y., assignor to Spacarb, Inc., New York, N. Y., a corporation of Delaware Application November 10, 1947, Serial No. 785,097

11 Claims. (Cl. 261—11)

The present invention relates to a device for the refrigeration of the materials utilized in the making of mixed drinks such as, for instance, water and syrup, and the carbonation of water for use in such drinks.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate an embodiment of the invention, and together with the description, serve to explain the principles of the invention.

The invention has for an object the provision of a relatively simple and compact unit comprising mechanism for efficiently cooling the materials which are combined to form mixed drinks and for carbonating and keeping cool the water used in such drinks. The invention is particularly adaptable for use in the making of soft drinks involving the mixing of carbonated water and syrup, and provides an efficient, sanitary, compact and trouble free mechanism for cooling and keeping cool immediately prior to dispensing the syrup and carbonated water, as well as carbonating the water under refrigerated conditions and maintaining for immediate use an adequate supply of the carbonated water. Still another object is the provision of a cooler-carbonator which may be easily and efficiently handled for installation and repair and which, although of wide general application, is particularly useful for drink dispensers of a portable type where a loose or free water cooler or carbonator is troublesome and unsanitary.

Figure 1:
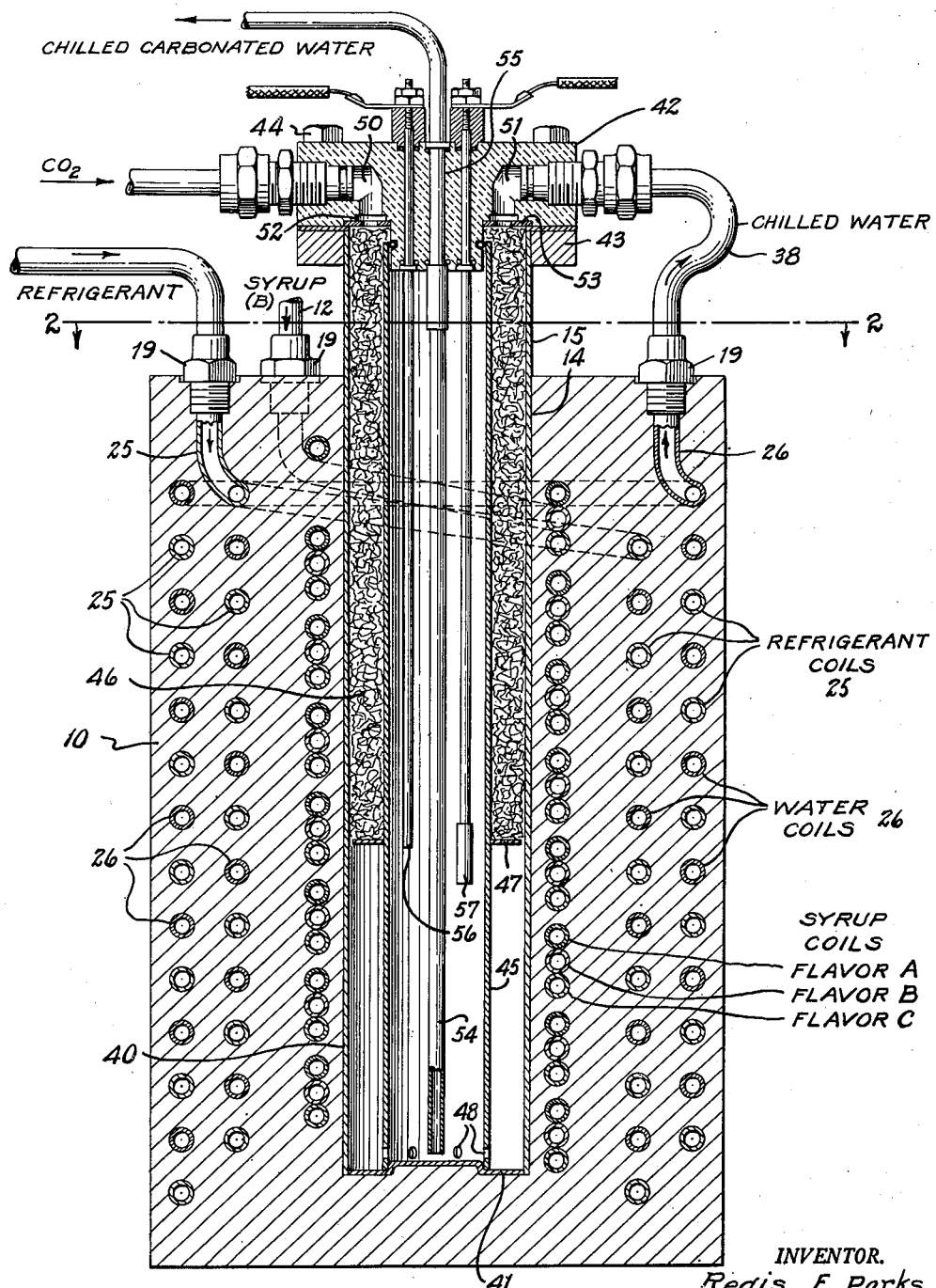
Fig. 1 is a vertical cross-sectional view, taken along line 1—1 of Fig. 2, of a typical and illustrative embodiment of the present invention.

Referring now in detail to the illustrative embodiment of the invention shown by way of example in the accompanying drawings, the invention comprises a compact unit adapted to cool one or more drink flavors or similar ingredients prior to dispensing or mixing, to cool water prior to, during and after its carbonation, and to carbonate water for admixing with the syrup and maintain an adequate supply of cooled and carbonated water on hand at all times. As best shown in Fig. 1 of the drawings, the unit comprises an illustratively cylindrical metallic casting or block 10 of aluminum or an aluminum alloy, for instance, into which are cast refrigerant, water and syrup tubes in a definite reationship and in the center of which there is provided a carbonating and water storing mechanism which may, if desired, also be cast into the block 10.

Figure 2:
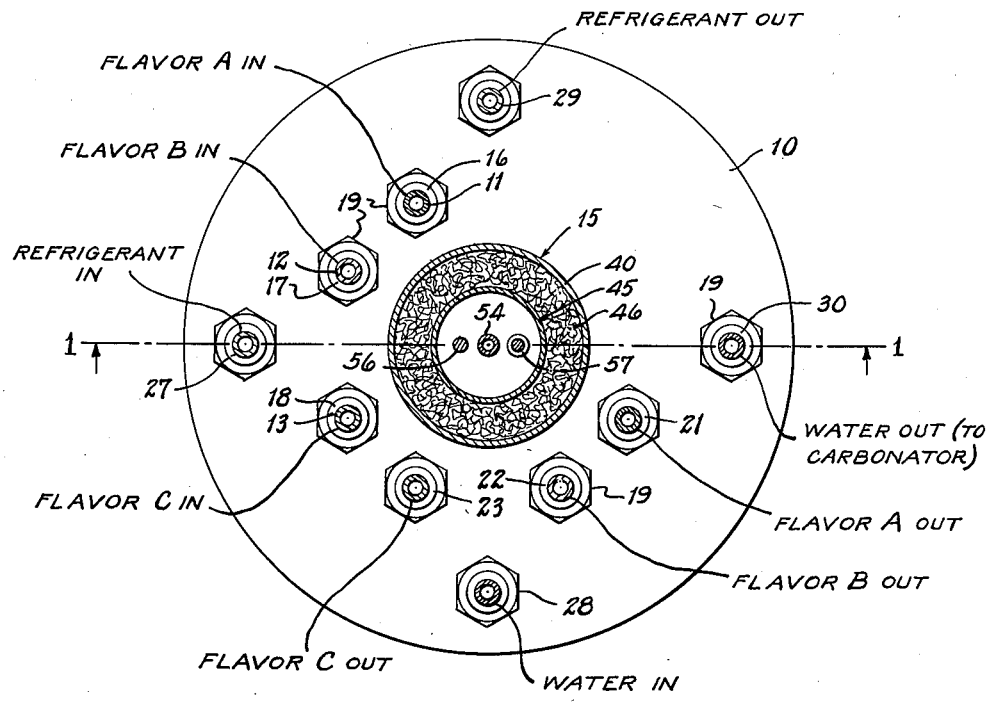
Fig. 2 is a view partly top plan and partly cross-sectional taken along line 2—2 of Fig. 1.

As shown, three tubes are provided for refrigerating three syrups, for instance, prior to their mixture with carbonated water as a drink, said tubes being designated by the numerals 11, 12 and 13 in the drawings. These tubes are designed to carry and refrigerate separately three different flavors such as designated in the drawings A, B and C respectively, and are arranged adjacent each other and parallel in a single spiral series within the casting 10, adjacent the central well 14 thereof which accommodates the carbonator 15, and are provided with entrance and exit ports at the top of the casting. The entrance ports for the syrup tubes 11, 12 and 13 are shown in Fig. 2 as ports 16, 17 and 18 respectively arranged at equal distances from the axis of casting 10, and suitable fittings 19 may be associated with the tubes and cast in the casting whereby lead-in tubes may be conveniently connected.

Figure 3:
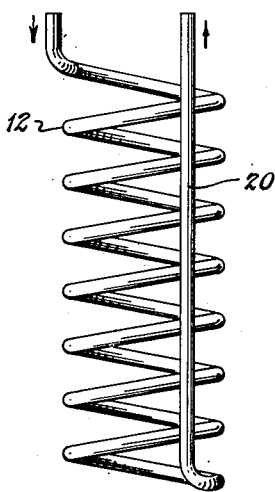
Fig. 3 is a detail view of certain of the coiled tube elements shown in Figs. 1 and 2 detached from the assembly; and, Fig. 4 is a detail view of certain other coiled tube elements shown in Figs. 1 and 2 detached from the assembly.

The syrup tubes 11, 12 and 13 are substantially identical in formation and each, as shown in the case of tube 12 in Figs. 1 and 3, extends downwardly for a short distance from the top of casting 10 and then is formed spirally along the length of the central well 14 of the casting. From the bottom of such spiral length a linear reach 20 extends directly to the exit port for the respective tube at the top of the casting, said exit ports being shown in Fig. 2 as 21, 22 and 23 arranged at equal distances from the axis of the casting 10 and angularly removed from their respective entrance ports 16, 17 and 18. The exit ports are likewise preferably provided with fittings 19 to facilitate connection with tubes leading to the dispensing nozzle or nozzles of a beverage vending device.

The refrigerant and water tubes 25 and 26 respectively are arranged parallel to each other, but spaced to prevent freezing, in a pair of spirals cast in the block 10 toward the outer extent of the radius thereof, the water being thus conducted in heat exchanging relationship with the refrigerant and the latter being positioned to absorb heat adjacent the outer surface of the unit, the inner portion being maintained in a constantly cooled condition for the syrup tubes and carbonator.

Figure 4:
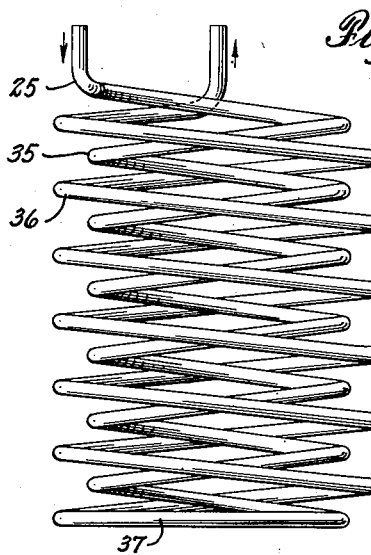

As shown, the refrigerant and water enter through ports 27 and 28 respectively provided with suitable fittings 19, and below said ports the tubes 25 and 26 are formed parallel to each other and in descending and ascending spirals of different diameter along the length of the well 14, returning to suitable exit ports 29 and 30 at the top of casting 10. The tubes 25 and 26 are substantially identically formed and, as shown in the case of the refrigerant tube 25 in Figs. 1 and 4, each comprises a radially inner spiral extent 35 extending to adjacent the bottom of the casting 10 and a radially outer spiral extent 36 of greater diameter leading back to the top of the casting and its exit port, said extents being joined at the bottom of the casting by the integral, substantially horizontal length of tubing 37. The refrigerant and water tubes are thus each formed as connected, overlapped spirals, and it will be noted that the closer tube extents of the respective spirals of different diameter carry unlike material, that is, all extents of a water tube in each such spiral lies more closely adjacent to the extents of a refrigerant tube in the other spiral than they do to the extents of a water tube. This staggered relationship of the ascending and descending spirals of parallel refrigerant and water tubes further increases the heat exchanging properties of the unit.

From the exit port 29 the refrigerant is returned to the compressing means (not shown), and from the exit port 30 the chilled water is conducted by a tube 38 to the carbonator 15 the major portion of which occupies the central well 14 of casting 10. The carbonator as herein illustratively shown is of the instantaneous type in which carbon dioxide gas and water are mixed to maintain a constant volume of carbonated water regardless of draft, and is generally similar in construction and operation to that disclosed in U. S. Patent No. 2,401,916 of June 11, 1946, to C. V. Di Pietro, to which reference may be had for a full description thereof. Such carbonator comprises a cylindrical shell 40 positioned within the central well 14 of the casting 10 and with its external surface in intimate contact with the walls of said well for maximum heat conduction, which may be effected by making the casting with the shell in place. A bottom wall 41 is secured to the shell 40, and a header 42 is removably secured to a flange 43 at the top thereof by means of bolts 44.

A cylindrical stand pipe 45 is positioned within the shell 40 an intervening annular chamber being thereby formed the upper part of which is filled with wool 46 formed of strips of material such as stainless steel, said wool being supported upon an annular plate 47 secured to the stand pipe 45. The plate 47 is spaced from the shell 40 allowing the passage of carbonated water to the lower portion of the annular chamber between the shells, and the inner shell or stand pipe 45 is provided with apertures 48 adjacent its lower edge for passage of carbonated water into the storage chamber within stand pipe 45.

The header 42, preferably made of plastic or some other non-conducting material, is formed with a carbon dioxide duct 50 to which such gas is conducted from a source, and with a water duct 51 to which chilled water is conducted through tube 38 from the outer spiral of the cooling tube 26. Said ducts empty into a shallow, annular recess 52 accommodating a diffuser ring 53, and gas and water are therein and through the wool 46 intimately mixed to form the carbonated water for the reservoir within said pipe 45. The water is drawn off to the drink mixing nozzle or nozzles by means of a tube 54 extending to near the bottom of the reservoir and communicating with a central duct 55 in the header 42, and a pair of electrodes 56 and 57 are positioned in the reservoir and secured to conductors through header 42 in order to maintain a predetermined carbonated water volume in the reservoir, as fully described in said Patent No. 2,401,916.

The invention in its broader aspects is not limited to the specific mechanisms shown and described but departures may be made therefrom, within the scope of the accompanying claims, without departing from the principles of the invention and without sacrificing its chief advantages.

What I claim is:

1. A device of the type described comprising, in combination, a metallic mass, a carbonator comprising an elongated cylindrical shell embedded axially in said mass and for substantially the full length of said mass, spirally formed water and refrigerant tubes embedded in said mass surrounding said carbonator spaced from each other and said carbonator, and a spirally formed drink ingredient tube surrounding said carbonator and embedded in said mass between said first tubes and said carbonator and spaced from said first tubes and said carbonator.

2. A device of the type described comprising, in combination, a metallic mass, a carbonator comprising an elongated cylindrical shell embedded axially in said mass and for substantially the full length of said mass, spirally formed water and refrigerant tubes embedded in said mass surrounding said carbonator spaced from each other and said carbonator, and a plurality of spirally formed drink ingredient tubes surrounding said carbonator and embedded in said mass between said first tubes and said carbonator and spaced from said first tubes and said carbonator.

3. A device of the type described comprising, in combination, a metallic mass, a carbonator comprising an elongated cylindrical shell embedded axially in said mass and for substantially the full length of said mass, water and refrigerant tubes each formed as a pair of connected spirals of different diameter one said spiral positioned within the other embedded in said mass surrounding said carbonator, and a spirally formed drink ingredient tube surrounding said carbonator and embedded in said mass all of said tubes being spaced from each other and said carbonator.

4. A device of the type described comprising, in combination, a metallic mass, a carbonator comprising an elongated cylindrical shell embedded axially in said mass and for substantially the full length of said mass, water and refrigerant tubes each formed as a pair of connected spirals of different diameter one said spiral positioned within the other embedded in said mass surrounding said carbonator, and a spirally formed drink ingredient tube surrounding said carbonator and embedded in said mass between said first tubes and said carbonator all of said tubes being spaced from each other and said carbonator.

5. A device of the type described comprising, in combination, a metallic mass, a carbonator comprising an elongated cylindrical shell embedded axially in said mass and for substantially the full length of said mass, spirally formed water and refrigerant tubes embedded in said mass surrounding said carbonator, said tubes being of the same diameter and parallel to each other whereby water and refrigerant tubes are positioned adjacent each other in heat exchanging relationship, and a spirally formed drink ingredient tube surrounding said carbonator and embedded in said mass between said first tubes and said carbonator.

6. A device of the type described comprising, in combination, a metallic mass, a carbonator comprising an elongated cylindrical shell embedded axially in said mass and for substantially the full length of said mass, spirally formed water and refrigerant tubes embedded in said mass surrounding said carbonator, said tubes being of the same diameter and parallel to each other whereby water and refrigerant tubes are positioned adjacent each other in heat exchanging relationship, and a plurality of spirally formed drink ingredient tubes surrounding said carbonator and embedded in said mass between said first tubes and said carbonator.

7. A device of the type described comprising, in combination, a metallic mass, a carbonator comprising an elongated cylindrical shell embedded axially in said mass and for substantially the full length of said mass, water and refrigerant tubes embedded in said mass surrounding said carbonator each formed as a pair of connected spirals of different diameter one positioned within the other forming radially inner and outer spirals for each of said tubes, the inner and outer spirals for the water tube being of the same diameter as the corresponding spirals of the refrigerant tube and parallel thereto, refrigerant spirals being radially adjacent water spirals, and a plurality of parallel, spirally formed drink ingredient tubes surrounding said carbonator and embedded in said mass between said first tubes and said carbonator.

8. A device of the type described comprising, in combination, a metallic mass, a carbonator comprising an elongated cylindrical shell embedded axially in said mass and for substantially the full length of said mass, parallel water and refrigerant tubes each formed as a pair of connected spirals of different diameter one said spiral positioned within the other, said tubes being so arranged that each extent of each tube is nearer to an extent of the other tube, and a spirally formed drink ingredient tube surrounding said carbonator and embedded in said mass between said first tubes and said carbonator.

9. A device of the type described comprising, in combination, a cylindrical cast metallic mass, a carbonator comprising an elongated cylindrical shell embedded axially and centrally in said mass and for substantially the full length of said mass, parallel water and refrigerant tubes each formed as a pair of connected spirals of different diameter one said spiral positioned within the other, said tubes being so arranged that each extent of each tube is nearer to an extent of the other tube, and a plurality of parallel, spirally formed drink ingredient tubes surrounding said carbonator and embedded in said mass between said first tubes and said carbonator.

10. A device of the type described comprising, in combination, a metallic mass, a carbonator comprising an elongated cylindrical shell embedded centrally and axially in said mass and for substantially the full length of said mass, individual conduits for water, refrigerant and a drink ingredient also embedded in said mass said water conduit discharging into said carbonator, said conduits being spaced in said mass from each other and from said carbonator and positioned radially outwardly in said mass from said carbonator, said refrigerant conduit surrounding said carbonator along substantially the entire length thereof in said mass, and said water and drink ingredient conduits extending substantially the entire length of said carbonator in said mass.

11. A device of the type described comprising, in combination, a metallic mass, a carbonator comprising an elongated cylindrical shell embedded centrally and axially in said mass and for substantially the full length of said mass, individual conduits for water and refrigerant also embedded in said mass said water conduit discharging into said carbonator, said conduits being spirally formed, surrounding said carbonator along substantially the entire length thereof in said mass, positioned radially outwardly in said mass from said carbonator, and spaced from each other and said carbonator, and a plurality of drink ingredient conduits embedded in said mass spaced from said carbonator and said other conduits, said drink ingredient conduits each having equal spacement from said carbonator.

REGIS E. PARKS.

REFERENCES CITED

The following references are of record in the file of this patent:

UNITED STATES PATENTS

| Number | Name | Date |
|---|---|---|
| 695,041 | Fues | Mar. 11, 1902 |
| 1,702,565 | Foster | Feb. 19, 1929 |
| 1,737,347 | Wilson | Nov. 26, 1929 |
| 2,142,856 | Lieb et al. | Jan. 3, 1939 |
| 2,337,783 | Thompson et al. | Dec. 28, 1943 |
| 2,391,003 | Bowman | Dec. 18, 1945 |
| 2,401,915 | Di Pietro | June 11, 1946 |
| 2,442,801 | Di Pietro | June 8, 1948 |
| 2,466,676 | Boling et al. | Apr. 12, 1949 |
| 2,498,524 | Booth | Feb. 21, 1950 |